3,213,096
QUATERNARY SALTS OF 1,4-DIAZONIABICYCLO-(2.2.2)-OCTANE
Frank Miller, Wilmington, Del., assignor to Air Products and Chemicals, Inc., a corporation of Delaware
No Drawing. Filed June 8, 1961, Ser. No. 115,608
3 Claims. (Cl. 260—268)

This invention relates to 1,4-diallyl-1,4-diazoniabicyclo-(2.2.2)-octane dihydroxide and its salts.

Recently triethylenediamine, sometimes called diazabicyclo-(2.2.2)-octane, has been described in Herrick 2,937,176. Certain quaternary derivatives of triethylenediamine are described in S. Oae et al., J. Org. Chem. 24, 1348 (1959).

In accordance with the present invention, compounds having the divalent cation 1,4-diallyl-1,4-diazoniabicyclo-(2.2.2)-octane and having compatible anions (e.g. chloride, bromide, iodide, fluoride, sulfate, nitrate, hydroxide, phosphate, acetate, propanoate, etc.) are prepared and utilized to exploit the advantageous characteristics of these novel compounds.

The invention is further clarified by reference to examples.

Example I

A two liter flask was equipped with a stirrer, thermometer and dropping funnel. The flask was charged with a solution of about 1 liter of anhydrous isopropanol as reaction solvent, in which 112 g. (1 mol) of triethylenediamine was dissolved. To this solution there was added dropwise 168 g. (2.2 mols) of allyl chloride with stirring; and the temperature was at about 35° C. during the addition. About 15 minutes after the addition was completed, the temperature rose to about 50° C., and the flask was placed in an ice-water bath. The reaction mixture came to room temperature overnight. The following morning, the product was diluted with 2 liters of water and the reaction mixture was extracted twice with about 200 ml. of pentane to remove excess allyl chloride. The aqueous isopropanol was removed by distillation, first at atmospheric pressure and then at 4 mm. Hg absolute pressure, to provide a crude brownish salt, which was dried overnight at 55° C. in a vacuum oven. The crude salt recovery was 251.5 g., or 94% of the theoretical yield. A sample was recrystallized twice from boiling butanol to provide crystals having a faint yellow color and melting at 197–200° C. Analysis of the recrystallized salt established its purity as

$[H_2C=CHCH_2N(CH_2CH_2)_3NCH_2CH=CH_2]Cl_2$ having the formula $C_{12}H_{22}N_2Cl_2$, finding 26.7% Cl (26.7% Cl theoretical) and 10.23% N (10.56% N theoretical).

The salt was hydroscopic; soluble in water or ethanol but substantially insoluble in acetone.

The chloride salts of quaternary amines have been employed as surface tension depressants in a great variety of formulations comprising an aqueous solvent. The effectiveness of 1,4-diallyl-1,4-diazoniabicyclo-(2.2.2)-octane dichloride as a surface tension depressant was established by measuring the height of rise of liquid in a capillary tube. At 26° C., distilled water rose to a height of 6.68 cm.; however, at the same temperature and with the same apparatus, an aqueous solution consisting only of water and 0.0377 molar (1% by weight) of said salt, rose to a height of only 2.96 cm., thus showing that the salt significantly reduced surface tension.

Example II

An aqueous solution of the chloride salt of Example I is treated with the basic form of ion exchange resins to provide an aqueous solution of the corresponding hydroxide. After vacuum distillation and drying, the free base is isolated as the 1,4-diallyl-1,4-diazoniabicyclo-(2.2.2)-octane dihydroxide.

Example III

A water solution of 1,4-diallyl-1,4-diazoniabicyclo-(2.2.2)-octane dihydroxide is divided into several portions and each treated with sufficient, i.e. one or two equivalents, acid to form the salt, which is recovered by distillation of the solvent and drying in a vacuum oven. Thus, the bromide, iodide, nitrate, sulfate, carbonate and acetate salts are prepared, and the method is shown to be suitable generically for preparing both the basic and the normal salts of water soluble acids. The free base and salts are effective in lowering the surface tension of water when present in concentrations of about 1%.

Example IV

Approximately 1% tertiarybutylperoxide is added to a methanol solution of 1,4-diallyl-1,4-diazoniabicyclo-(2.2.2)-octane dichloride and the reaction mixture is polymerized to a polymer having the advantageous properties of a polymeric linear quaternary chloride. Because of the relative ease with which quaternary compounds are decomposed and because the decomposition of a quaternary of triethylene diamine can provide a plurality of reactive fragments, such polymers are uniquely useful in selected applications.

Copolymers of the diacetate salt of 1,4-diallyl-1,4-diazoniabicyclo-(2.2.2)-octane dihydroxide with appropriate copolymerizable monomers (a few examples including methylmethacrylate, styrene, vinyl acetate and butadiene) also have to a lesser extent the water-solubilizing, easy decomposing, and related properties of the bridgehead quaternary group.

Example V

Triethylenediamine, water and propylene oxide are reacted to prepare 1,4-(2-hydroxypropyl)-1,4-diazoniabicyclo-(2.2.2)-octane dihydroxide, which is reacted with acetic anhydride to form acetate ester. The 1,4-(2-acetylpropyl)-1,4-diazoniabicyclo-(2.2.2)-octane diacetate is deacetylated by heating a dispersion thereof in boiling xylene through which a stream of carbon dioxide is bubbled. The heating is discontinued after the theoretical quantity of acetic acid is recovered in the distillate. The xylene solvent is removed by distillation and drying overnight in the vacuum oven. The crude diallyltriethylenediamine compound is recrystallized twice from boiling butanol and subjected to ion exchange to form the chloride salt. The dichloride derivative is shown to be identical to the allyl chloride derivative of Example I by the mixed melting point of 197–200° C.

Obviously many modifications and variations of the invention as hereinbefore set forth may be made without departing from the spirit and scope thereof, and therefore only such limitations should be imposed as are indicated in the appended claims.

What is claimed is:
1. The compound 1,4 - diallyl - 1,4 - diazoniabicyclo-(2.2.2)-octane dichloride.
2. The compound 1,4 - diallyl - 1,4 - diazoniabicyclo-(2.2.2)-octane dihydroxide.
3. The compound 1,4 - diallyl - 1,4 - diazoniabicyclo-(2.2.2)-octane dibromide.

References Cited by the Examiner

UNITED STATES PATENTS

| | | | |
|---|---|---|---|
| 2,973,361 | 2/61 | Rudner | 260—268 |
| 2,973,368 | 2/61 | Rice et al. | 260—268 |
| 3,010,063 | 11/61 | Erner | 260—268 |
| 3,018,619 | 1/62 | Doss et al. | |

OTHER REFERENCES

Oae et al.: Journal Organic Chemistry, vol. 24, pp. 1348–1349 (1959).

NICHOLAS S. RIZZO, *Primary Examiner.*

IRVING MARCUS, WALTER A. MODANCE,
*Examiners.*